US005643841A

United States Patent [19]

Yamaki et al.

[11] Patent Number: 5,643,841

[45] Date of Patent: Jul. 1, 1997

[54] RESISTIVE PASTE

[75] Inventors: Sachiko Yamaki; Keisuke Nagata; Hiroji Tani, all of Kyoto, Japan

[73] Assignee: Murata Manufacturing Co., Ltd., Japan

[21] Appl. No.: 339,397

[22] Filed: Nov. 14, 1994

[30] Foreign Application Priority Data

| | | | |
|---|---|---|---|
| Nov. 16, 1993 | [JP] | Japan | 5-286892 |
| Jun. 6, 1994 | [JP] | Japan | 6-123853 |

[51] Int. Cl.[6] .......... C03C 8/16

[52] U.S. Cl. .......... 501/20; 501/17; 501/19; 501/96.3

[58] Field of Search .......... 501/87, 98, 96, 501/20, 17, 19

[56] References Cited

U.S. PATENT DOCUMENTS

| | | | |
|---|---|---|---|
| 4,225,468 | 9/1980 | Donohue et al. | 252/509 |
| 4,985,176 | 1/1991 | Watanabe et al. | 501/17 |
| 5,036,027 | 7/1991 | Watanabe et al. | 501/96 |
| 5,202,292 | 4/1993 | Tanabe et al. | 501/17 |
| 5,387,559 | 2/1995 | Nagata et al. | 501/17 |
| 5,397,751 | 3/1995 | Nagata et al. | 501/20 |
| 5,494,864 | 2/1996 | Nagata et al. | 501/20 |

FOREIGN PATENT DOCUMENTS

| | | |
|---|---|---|
| 59-6481 | 2/1984 | Japan . |
| 63-224301 | 9/1988 | Japan . |
| 2249203 | 10/1990 | Japan . |

OTHER PUBLICATIONS

Patent Abstracts of Japan, vol. 18, No. 158, 16 Mar. 1994 & JP-A-05 335106, 17 Dec. 1993.

Database WPI, Section Ch, Week 944, Derwent Publications Ltd., London, GB; Class L03, AN 94-029246 & JP-A-05 335 107, 17 Dec. 1993.

*Primary Examiner*—Mark L. Bell
*Assistant Examiner*—Louis M. Troilo
*Attorney, Agent, or Firm*—Ostrolenk, Faber, Gerb & Soffen, LLP

[57] ABSTRACT

A resistive paste comprising (a) a solid content comprising (al) a resistive material having a composition of $Nb_xLa_{1-x}B_{6-4x}$, wherein x is from 0.1 to 0.9 mol, and (a2) non-reducing glass frit, (b) from 1 to 10% by weight, based on the solid content, of $TiO_2$ as a first additive, (c) from 1 to 10% by weight, based on the solid content, of at least one second additive selected from the group consisting of $Co_3O_4$, CoO, and $Fe_2O_3$, and (d) an organic vehicle.

8 Claims, No Drawings

RESISTIVE PASTE

FIELD OF THE INVENTION

This invention relates to a resistive paste which can be baked in a neutral or reducing atmosphere and has improved temperature coefficient of resistivity.

BACKGROUND OF THE INVENTION

A circuit pattern composed of electrodes, resistors, etc., on which various electronic parts are mounted, has been generally formed on a ceramic base made of alumina, etc., and the electrodes are generally formed by screen printing a paste comprising a noble metal, e.g., silver or a silver-palladium alloy, on the ceramic base followed by baking in air.

However, because not only of expensiveness of the noble metal paste but also of the demand for sufficient migration resistance of the resistive paste to cope with the decreasing electrode distance due to size reduction of electronic equipment and parts, the noble metal paste has recently been displaced with a paste of a base metal, e.g., copper, nickel or aluminum. Such a base metal paste is screen-printed on a ceramic base and baked in a neutral or reducing atmosphere to form an inexpensive electrode pattern having excellent characteristics.

When electrodes are formed by using such a base metal paste, resistors which are arranged to bridge over the electrodes should also be formed by using a resistive paste which can be baked in a neutral or reducing atmosphere. Examples of known resistive pastes which can be baked in a neutral or reducing atmosphere include $LaB_6$-based pastes (as described in JP-B-59-6481, the term "JP-B" as used herein means an "examined published Japanese patent application"), $NbB_2$-based pastes (as described in JP-A-63-22430, the term "JP-A" as used herein means an "unexamined published Japanese patent application"), and Nb-La-B-based pastes (as described in JP-A-2-249203).

A desired surface resistivity over a broad range has been obtained by varying the mixing ratio of a resistive material and glass frit. In using the $LaB_6$-based or $NbB_2$-based resistive pastes, however, the surface resistivity suffers drastic changes with a slight variation in glass frit amount due to poor affinity between the resistive material and glass frit. Therefore, the range of surface resistivity in which satisfactory reproducibility can be assured has been limited.

On the other hand, resistors formed of the $Nb_xLa_{1-x}B_{6-4x}$-based paste show a milder increase in surface resistivity than with those formed of the $LaB_6$-based pastes or $NbB_2$-based pastes. Accordingly, the $Nb_xLa_{1-x}B_{6-4}$ 4-based paste has an advantage of a broadened surface resistivity range of from 10 Ω/square to 10 MΩ/square by varying the mixing ratio of resistive material to glass frit. However, the resistors formed of the $Nb_xLa_{1-x}B_{6-4x}$-based paste, particularly those adjusted to have a low surface resistivity (e.g., from about 10 Ω/square to 100 Ω/square), show a tendency of the temperature coefficient of resistivity (hereinafter abbreviated as "TCR") shifting to the plus (+) direction with its absolute value getting far from zero. In this point, they do not always satisfy the characteristics required for practical use.

SUMMARY OF THE INVENTION

An object of the present invention is to provide an $Nb_xLa_{1-x}B_{6-4x}$-based resistive paste which can be baked in a neutral or reducing atmosphere and whose TCR in a low surface resistivity range can be shifted to the minus (–) direction so as to get close to zero in its absolute value.

Other objects and effects of the present invention will be apparent from the following description.

The present invention relates to a resistive paste comprising:

(a) a solid content comprising (a1) a resistive material having a composition of $Nb_xLa_{1-x}B_{6-4x}$, wherein x is from 0.1 to 0.9 mol, and (a2) non-reducing glass frit, (b) from 1 to 10% by weight, based on the total amount of the solid content, of $TiO_2$ as a first additive, (c) from 1 to 10% by weight, based on the total amount of the solid content, of at least one second additive selected from the group consisting of $Co_3O_4$, CoO, and $Fe_2O_3$, and (d) an organic vehicle.

DETAILED DESCRIPTION OF THE INVENTION

In the present invention, $Nb_xLa_{1-x}B_{6-4x}$, wherein x is from 0.1 to 0.9 mol, preferably from 0.2 to 0.8 mol, is used as a resistive material (a1). If x is less than 0.1 mol, it tends to be difficult to gradually increase the surface resistivity, while if x is more than 0.9 mol, the change rate of surface resistivity with the content of glass frit tends to become large, thus making it difficult to improve the reproducibility of the surface resistivity.

The grain size of the resistive material is generally from 0.1 to 5 μm. If the grain size is less than 0.1 μm, a prolonged period of grinding time is required to prepare the resistive material, and impurities introduced during the grinding tend to adversely affect the properties of the resistive material. If the grain size is more than 5 μm, it tends to be difficult to obtain a constant resistivity in a stable manner.

The resistive material can be prepared in any conventional manner, such as those described in U.S. Pat. 5,036,027.

Examples of the non-reduced glass frit (a2) used in the present invention include alkali earth borosilicate, boroaluminosilicate, etc. The grain size of the non-reduced glass frit is generally from 1 to 10 μm. If the grain size is less than 1 μm, the change rate of surface resistivity tends to be too large, while if it is more than 10 μm, it tends to be difficult to obtain uniform resistors in a stable manner. The non-reduced glass frit can be prepared in any conventional manner, such as by mixing appropriate oxides followed by being fused.

The weight ratio of the resistive material (a1) to the non-reduced glass frit (a2) in the solid content (a) can be widely varied depending on the desired surface resistivity and the like, and is generally from 5/100 to 70/100 by weight in the present invention.

$TiO_2$ as the first additive (b) is added to the solid content comprising resistive material and glass frit in an amount of from 1 to 10% by weight, preferably from 2 to 7% by weight, based on the total amount of the solid content. At least one member selected from the group consisting of $Co_3O_4$, CoO, and $Fe_2O_3$ as the second additive (c) is also added to the solid content in an amount of from 1 to 10% by weight, preferably from 2 to 5% by weight, based on the total amount of the solid content. If the amount of at least one of the first and second additives is less than 1% by weight, the resulting resistor will have a TCR insufficiently shifted to the minus (–) direction. If the amount of at least one of the first and second additives is more than 10% by weight, the resulting resistor will have a TCR too largely shifted to the minus (–) direction.

In the present invention, it is preferred to use (1) a combination of from 2 to 7% by weight (particularly 5% by weight) of $TiO_2$ and from 2 to 5% by weight (particularly 5% by weight) of $Co_3O_4$ or (2) a combination of from 2 to 7% by weight (particularly 5% by weight) of $TiO_2$ and from 1 to 3% by weight (particularly 3% by weight) of $Fe_2O_3$.

An organic vehicle (d) is used for forming the resistive paste according to the present invention. Examples thereof include an acrylic resin and an ethylcellulose diluted with terpenes such as α-terpineol, β-terpineol or a mixture thereof with other solvents such as kerosine, butyl carbitol, butyl carbitol acetate and high boiling alcohols and alcohol esters. The organic vehicle should be thixotropic in order that it set up rapidly after being screened, thereby giving good resolution.

In the resistive paste of the present invention, the ratio of the amount of the organic vehicle (d) to the total amount of the solid content (a) and the additives (b) and (c) is generally from 20/80 to 60/40 by weight, and preferably from 30/70 to 50/50 by weight.

The resistive paste of the present invention can be produced in any conventional manner for preparing resistive pastes. For example, a resistive material and a glass frit, which have been separately prepared, are mixed with the first and second additives, and the resulting mixture is kneaded with an organic vehicle to form a resistive paste according to the present invention.

The resistive paste of the present invention can be used in the similar manner as in conventional resistive pastes. For example, the resistive paste can be printed on a suitable base, such as a ceramic base, by screen printing, dried at 150° C. for 10 minutes, and then baked at a peak temperature at 900° C. for 10 minutes in a nitrogen atmosphere.

The surface resistivity of the resistor, which is formed from the resistive paste of the present invention, is not particularly limited and is generally from 10 Ω/square to 200 Ω/square, and preferably from 20 Ω/square to 100 Ω/square.

The present invention will be illustrated in greater detail with reference to the Example below, but it should be understood that the present invention is not construed as being limited thereto. All the percents are by weight unless otherwise indicated.

EXAMPLE

Preparation of Electrodes:

A conductive paste containing Cu as a base metal was screen printed on an alumina ceramic base and baked in a nitrogen atmosphere to form electrodes.

Preparation of Resistive Paste:

Powdered $NbB_2$ and $LaB_6$ were weighed and mixed to provide a composition of $Nb_xLa_{1-x}B_{6-4x}$, with x being varied between 0.1 mol and 0.9 mol as shown in Table 1 below. The mixture was calcined in a nitrogen atmosphere for 2 hours at a temperature increase rate of 3° C./min with the peak temperature set at 1,000° C. to prepare a solid solution of $LaB_6$ in $NbB_2$. The resulting mixture was ground in a vibration mill to an average particle size of 1 μm and dried to obtain a resistive material having a composition of $Nb_xLa_{1-x}B_{6-4x}$ (where x is 0.1 to 0.9 mol).

Separately, $B_2O_3$, $SiO_2$, BaO, CaO, $Nb_2O_5$ and $K_2O$ were mixed at a molar ratio of 35.56/31.24/17.78/10.04/2.41/2.97 and fused at a temperature of from 1,200 to 1,350° C. to prepare a fused glass. The fused glass was quenched in pure water and ground in a vibration mill to an average particle size of 5 μm or smaller to prepare non-reducing glass frit.

The resulting mixture was kneaded with an organic vehicle composed of an acrylic resin diluted with α-terpineol to prepare a resistive paste.

TABLE 1

| Sample No. | x*1 (mol) | Resistive Material (wt %) | Glass Frit (wt %) | First Additive ($TiO_2$) (wt %*2) | Second Additive (wt %*2) CoO | $Co_3O_4$ | $Fe_2O_3$ |
|---|---|---|---|---|---|---|---|
| 1*3 | 0.50 | 40 | 60 | 0 | 5 | 0 | 0 |
| 2 | 0.50 | 40 | 60 | 2 | 5 | 0 | 0 |
| 3 | 0.50 | 40 | 60 | 5 | 5 | 0 | 0 |
| 4 | 0.50 | 40 | 60 | 9 | 5 | 0 | 0 |
| 5*3 | 0.50 | 40 | 60 | 11 | 5 | 0 | 0 |
| 6*3 | 0.25 | 40 | 60 | 0 | 0 | 0 | 0 |
| 7*3 | 0.25 | 40 | 60 | 5 | 0 | 0 | 0 |
| 8 | 0.25 | 40 | 60 | 5 | 2 | 0 | 0 |
| 9 | 0.25 | 40 | 60 | 5 | 5 | 0 | 0 |
| 10 | 0.25 | 40 | 60 | 5 | 9 | 0 | 0 |
| 11*3 | 0.25 | 40 | 60 | 5 | 11 | 0 | 0 |
| 12 | 0.25 | 40 | 60 | 5 | 0 | 2 | 0 |
| 13 | 0.25 | 40 | 60 | 5 | 0 | 5 | 0 |
| 14 | 0.25 | 40 | 60 | 5 | 0 | 9 | 0 |
| 15*3 | 0.25 | 40 | 60 | 5 | 0 | 11 | 0 |
| 16 | 0.25 | 40 | 60 | 5 | 0 | 0 | 2 |
| 17 | 0.25 | 40 | 60 | 5 | 0 | 0 | 5 |
| 18 | 0.25 | 40 | 60 | 4 | 0 | 0 | 9 |
| 19*3 | 0.25 | 40 | 60 | 5 | 0 | 0 | 11 |
| 20*3 | 0.75 | 40 | 60 | 0 | 0 | 0 | 0 |
| 21*3 | 0.75 | 40 | 60 | 5 | 0 | 0 | 0 |
| 22 | 0.75 | 40 | 60 | 5 | 2 | 0 | 0 |
| 23 | 0.75 | 40 | 60 | 5 | 5 | 0 | 0 |
| 24 | 0.75 | 40 | 60 | 5 | 9 | 0 | 0 |
| 25*3 | 0.75 | 40 | 60 | 5 | 11 | 0 | 0 |
| 26 | 0.75 | 40 | 60 | 5 | 0 | 2 | 0 |
| 27 | 0.75 | 40 | 60 | 5 | 0 | 5 | 0 |
| 28 | 0.75 | 40 | 60 | 5 | 0 | 9 | 0 |
| 29*3 | 0.75 | 40 | 60 | 5 | 0 | 11 | 0 |

TABLE 1-continued

| Sample | $x^{*1}$ | Resistive Material | Glass Frit | First Additive ($TiO_2$) | Second Additive (wt %*2) | | |
|---|---|---|---|---|---|---|---|
| No. | (mol) | (wt %) | (wt %) | (wt %*2) | CoO | $Co_3O_4$ | $Fe_2O_3$ |
| 30 | 0.75 | 40 | 60 | 5 | 0 | 0 | 2 |
| 31 | 0.75 | 40 | 60 | 5 | 0 | 0 | 5 |
| 32 | 0.75 | 40 | 60 | 5 | 0 | 0 | 9 |
| 33*3 | 0.75 | 40 | 60 | 5 | 0 | 0 | 11 |
| 34 | 0.50 | 40 | 60 | 5 | 3 | 3 | 0 |
| 35 | 0.50 | 40 | 60 | 5 | 0 | 3 | 3 |
| 36 | 0.50 | 40 | 60 | 5 | 3 | 0 | 3 |
| 37 | 0.50 | 40 | 60 | 5 | 2 | 2 | 2 |

Note:
*1x in $Nb_xLa_{1-x}B_{6-4x}$
*2Based on the resistive material/glass frit mixture.
*3Sample out of the scope of the present invention.

Preparation of Resistor:

Each of the resistive pastes of Table 1 was screen printed on the alumina base in a size of 1.5 mm long, 1.5 mm wide, and 20 μm thick (dry thickness), inclusive of a part of the electrodes, dried at 150° C. for 10 minutes, and baked in a nitrogen atmosphere with its peak temperature set at 900° C. for 10 minutes to form a resistor.

Evaluation:

The surface resistivity and TCR of each sample thus prepared were measured. The results obtained are shown in Table 2 below.

TABLE 2

| Sample | Surface Resistivity | TCR (ppm/°C.) | |
|---|---|---|---|
| No. | (Ω/square) | −55° C. | +150° C. |
| 1* | 17 | +478 | +468 |
| 2 | 20 | +216 | +233 |
| 3 | 22 | +157 | +242 |
| 4 | 38 | +121 | +159 |
| 5* | 78 | −377 | −414 |
| 6* | 24 | +388 | +390 |
| 7* | 34 | +420 | +367 |
| 8 | 32 | +242 | +157 |
| 9 | 35 | +205 | +201 |
| 10 | 40 | +137 | +105 |
| 11* | 72 | −240 | −265 |
| 12 | 33 | +107 | −2 |
| 13 | 36 | −197 | −83 |
| 14 | 42 | −398 | −133 |
| 15* | 86 | −450 | −511 |
| 16 | 40 | +126 | +13 |
| 17 | 46 | −50 | −48 |
| 18 | 51 | −210 | −254 |
| 19* | 145 | −450 | −463 |
| 20* | 140 | +430 | +390 |
| 21* | 182 | +355 | +341 |
| 22 | 170 | +150 | +121 |
| 23 | 183 | +63 | +55 |
| 24 | 192 | −142 | −127 |
| 25* | 255 | −387 | −368 |
| 26 | 172 | +200 | +187 |
| 27 | 179 | +177 | +150 |
| 28 | 189 | +33 | +21 |
| 29* | 268 | −391 | −389 |
| 30 | 201 | +125 | +103 |
| 31 | 234 | +58 | +27 |
| 32 | 256 | −154 | −160 |
| 33* | 305 | −405 | −413 |
| 34 | 115 | +75 | +81 |
| 35 | 122 | +52 | +59 |

TABLE 2-continued

| Sample | Surface Resistivity | TCR (ppm/°C.) | |
|---|---|---|---|
| No. | (Ω/square) | −55° C. | +150° C. |
| 36 | 128 | +49 | +55 |
| 37 | 108 | +72 | +83 |

Note:
*Samples out of the scope of the present invention.

It can be seen from Table 2 that Sample No. 1 (x=0.50 mol) containing only 5% CoO as a second additive with no first additive had a TCR of +478 ppm/° C. at −55° C. and +468 ppm/° C. at +150° C., while samples containing 1 to 10% of $TiO_2$ as a first additive and 5% of CoO as a second additive had a TCR shifted to the minus (−) direction compared with Sample No. 1. It is noted that Sample No. 5 containing more than 10% of the first additive (Ti02) shows too a great shift of the TCR to the minus (−) direction, failed to exhibit satisfactory characteristics as a resistor.

It is also seen that Sample No. 7 containing only the first additive but no second additive had a TCR of +420 ppm/° C. at −55° C. and +367 ppm/° C. at +150° C., whereas samples additionally containing from 1 to 10% of a second additive selected from CoO, $Co_3O_4$ and $Fe_2O_3$ had a TCR shifted to the minus (−) direction compared with that of Sample No. 7, with the surface resistivity being substantially equal. To the contrary, Sample Nos. 11, 15, and 19 containing more than 10% of a second additive had a TCR too largely shifted to the minus (−) direction, thus failing to exhibit satisfactory characteristics as a resistor.

Similarly, Sample No. 21 (x=0.75 mol) containing only a first additive but no second additive showed a TCR of +355 ppm/° C. at −55° C. and +341 ppm/° C. at +150° C., while the samples additionally containing from 1 to 10% of a second additive selected from CoO, $Co_3O_4$, and $Fe_2O_3$ showed a shift of TCR to the minus (−) direction compared with Sample No. 21, with the surface resistivity being substantially equal. Note that Sample Nos. 25, 29, and 33 containing more than 10% of a second additive showed too large a shift of TCR to the minus (−) direction, failing to exhibit satisfactory characteristics as a resistor.

Samples containing, in addition to a first additive, second additives in a total amount of 6% (Sample Nos. 34, 35, 36, and 37) also exhibit satisfactory characteristics as having a TCR of +49 to +75 ppm/° C. at −55° C. and +55 to +83 ppm/° C. at +150° C.

In short, addition of the above-mentioned first and second additives to an $Nb_xLa_{1-x}B_{6-4x}$-based resistive paste (x is from 0.1 to 0.9) is effective to make the TCR of the resistor formed of that resistive paste get closer to zero, shifting the TCR to the minus (−) direction, without causing a substantial change in surface resistivity. If the amount either of first or second additive exceeds 10%, the surface resistivity increases, and the TCR is shifted to the minus direction too largely.

Incidentally, where x in an $Nb_xLa_{1-x}B_{6-4x}$-based paste is less than 0.1, the resistivity is significantly reduced, and if it exceeds 0.9, the resistivity markedly increases. In either case, such a resistive material cannot exhibit satisfactory performance as a resistor at any mixing ratio with glass frit.

As described and demonstrated above, the resistive paste according to the present invention comprises a solid content of a resistive material having a composition of $Nb_xLa_{1-x}B_{6-4x}$ (x=0.1 to 0.9 mol) and non-reducing glass frit, from 1 to 10% by weight, based on the solid content, of $TiO_2$ as a first additive, and from 1 to 10% by weight, based on the solid content, of at least one second additive selected from the group consisting of $Co_3O_4$, CoO, and $Fe_2O_3$. According to the present invention, it is possible to shift the temperature coefficient of surface resistivity in a low resistivity range of a resistor formed by baking an $Nb_xLa_{1-x}B_{6-4x}$-based resistive paste to the minus (−) direction so that the resistive paste of the present invention sufficiently satisfies the characteristics required for a resistive paste to be baked in a neutral or reducing atmosphere.

While the invention has been described in detail and with reference to specific examples thereof, it will be apparent to one skilled in the art that various changes and modifications can be made therein without departing from the spirit and scope thereof.

What is claimed is:

1. A resistive paste comprising:

(a) a solid content comprising (a1) a resistive material having a composition of $Nb_xLa_{1-x}B_{6-4x}$, wherein x is from 0.1 to 0.9 mol, and (a2) non-reducing glass frit, (b) from 1 to 10% by weight, based on the solid content, of $TiO_2$ as a first additive, (c) from 1 to 10% by weight, based on the solid content, of at least one second additive selected from the group consisting of $Co_3O_4$, CoO, and $Fe_2O_3$, and (d) an organic vehicle.

2. A resistive paste as claimed in claim 1, wherein the amount of said first additive (b) is from 2 to 7% by weight, based on the solid content, and the amount of said second additive (c) is from 2 to 5% by weight, based on the solid content.

3. A resistive paste as claimed in claim 2, wherein said first additive (b) is from 2 to 7% by weight, based on the solid content, of $TiO_2$ and said second additive (c) is from 2 to 5% by weight, based on the solid content, of $Co_3O_4$.

4. A resistive paste as claimed in claim 2, wherein said first additive (b) is from 2 to 7% by weight, based on the solid content, of $TiO_2$ and said second additive (c) is from 1 to 3% by weight, based on the solid content, of $Fe_2O_3$.

5. A resistive paste as claimed in claim 4, wherein said first additive (b) is 5% by weight and said second additive (c) is 3% by weight.

6. A resistive paste as claimed in claim 3, wherein said first additive (b) is 5% by weight and said second additive (c) is 5% by weight.

7. A resistive paste as claimed in claim 2, wherein the amount of said organic vehicle (d) is 30–50% by weight based on the total weight of the solid content (a), first additive (b) and second additive (c).

8. A resistive paste as claimed in claim 1, wherein the amount of said organic vehicle (d) is 20–60% by weight based on the total weight of the solid content (a), first additive (b) and second additive (c).

* * * * *